United States Patent Office 2,837,444
Patented June 3, 1958

2,837,444
AQUEOUS LATEX PAINT AND A POROUS SURFACE COATED THEREWITH

Frank J. Hahn, Springfield, Mass., assignor to Monsanto Chemical Company, St. Louis, Mo., a corporation of Delaware No Drawing. Application August 22, 1956
Serial No. 605,474

5 Claims. (Cl. 117—72)

This invention relates to aqueous latices of certain quadricomponent interpolymers. More particularly, the invention relates to modifications of said latices.

The quadricomponent interpolymers of this invention are interpolymers of (1) a monovinylidene aromatic hydrocarbon, (2) an unsaturated monocarboxylic acid, (3) an unsaturated nitrile, and (4) a restricted class of acrylic or methacrylic esters. The process for preparation of the quadricomponent interpolymers and the latices resulting from the process are disclosed and claimed in U. S. Serial Number, 467,564, filed November 8, 1954, now Patent Number 2,767,153, in the name of Ernest Alexander Sutton.

The latices of the quadricomponent interpolymers may be compounded with various fillers, pigments, etc., to provide excellent exterior paints but the one drawback of these paints is that they exhibit poor durability when directly applied over unpainted wood, or over surfaces coated with a severely chalked paint without first applying a primer or in the latter case cleaning the surfaces by sandblasting. As a result, the painter must maintain a supply of two quite different paints or be prepared to carry out an expensive sandblasting operation.

One object of this invention is to modify aqueous latices of quadricomponent interpolymers.

A further object is to provide an aqueous latex paint which may be used as an undercoat or primer coat for exterior surfaces.

These and other objects are attained by adding an oil-modified alkyd resin containing a conventional drying catalyst to an aqueous latex paint formulated from certain quadricomponent interpolymers as hereinafter described.

The following examples are given in illustration of the paints of this invention. Where parts are mentioned, they are parts by weight.

EXAMPLE I

A 50% solids interpolymer latex is prepared for use in the subsequent examples. The interpolymer prepared consists of 40% 2-ethylhexyl acrylate, 52% styrene, 6% acrylonitrile, and 2% methacrylic acid. The following solutions are prepared:

|  | Parts |
|---|---|
| Monomer premix "A": |  |
| Acrylonitrile | 6 |
| Styrene | 14 |
| Monomer premix "B": |  |
| Styrene | 38 |
| 2-ethylhexyl acrylate | 40 |
| Methacrylic acid | 2 |
| Catalyst premix: |  |
| Potassium Persulfate | 0.5 |
| 30% solids isopropanol solution of an alkyl aryl polyether sulfate | 1.0 |
| Water | 25 |
| Reaction vessel charge: |  |
| Alkylaryl polyether alcohol | 0.2 |
| Water | 75 |

The reaction vessel charge listed above is charged to a glass-lined reaction vessel fitted with a reflux condenser and an agitator. The reaction mixture is brought to reflux temperature and the catalyst premix is added thereto at a constant rate over an 80-minute period. The monomer premix "A" is added to the refluxing reaction vessel charge over a 30-minute period and then monomer premix "B" is added over the next 50-minute period. The reaction mixture is maintained under reflux until the temperature peaks, at which time the polymerization is substantially complete. The resultant latex is cooled to room temperature and the pH thereof is adjusted to 8–9 with 28% ammonium hydroxide. The latex obtained contains 50% solids, is grain and lump-free, and has an average particle size of about 0.2 to 0.3 micron.

EXAMPLE II

Prepare an oil-modified alkyd resin by mixing together 100 parts of pentaerythritol, 100 parts of phthalic anhydride, and 410 parts of soybean oil acids and heating the mixture to 220–240° C. until the acid number is 10 or less. The product is a liquid resin containing about 16 weight percent of pentaerythritol, about 16 weight percent of phthalic acid and about 68 weight percent of soybean oil acids. The resin has a viscosity of about M–O on the Gardner-Holt scale. A catalytic amount of a conventional drier such as cobalt naphthenate should be added to the resin prior to admixture of the resin with the latex in the preparation of the coating compositions of this invention.

To prepare a coating composition from the latex of Example I the desired pigments are predispersed in water with the aid of a small amount of a conventional dispersing agent and the pigment dispersion is then mixed with the interpolymer latex. Thereafter the liquid "long oil" alkyd is dispersed in the pigmented latex with or without the addition of a further emulsifying agent.

EXAMPLE III

Disperse 25 parts of titanium dioxide, 5 parts of china clay, and 30 parts of talc in 40 parts of water using a small amount (about 1.0 part) of sodium sulfosuccinate as dispersing agent. Mix this dispersion with 40 parts of the latex of Example I until a homogeneous dispersion is obtained. The product is an example of the basic coating compositions of this invention which are useful as top coats or finish coats for exterior surfaces.

EXAMPLE IV

Divide the coating composition of Example III into four equal parts and add different amounts of the alkyd resin of Example II to each part. The constitution of the coating compositions thus made is set forth in the following table in which the figures represent parts by weight.

|  | A | B | C | D |
|---|---|---|---|---|
| Water (total) | 15 | 15 | 15 | 15 |
| Pigment | 15 | 15 | 15 | 15 |
| Interpolymer | 5 | 5 | 5 | 5 |
| Alkyd resin |  | 1 | 4 | 6 |

Apply an undercoat of A, B, C and D to unpainted cedar shingles and to chalked weathered asbestos cement shingles and cinder blocks. Then apply a second coat of A to each painted surface. On exposure to outdoor weathering conditions for from two to three years, the paint on the surfaces having an undercoat of composition A will crack or flake off whereas the paint on the surfaces undercoated with compositions B, C or D will show no signs of deterioration.

Similar tests run with a glycerol-phthalic anhydride-linseed oil resin, in which the phthalic anhydride content is about 10 weight percent and the acids from the linseed oil constitute about 76 weight percent with the remainder being glycerol derived in part from the oil, show substantially no deterioration after extended weathering tests.

The compositions of this invention are pigmented coating compositions in which the vehicle and pigment binder consist essentially of a synthetic resin latex having emulsified therein an oil-modified alkyd resin in an amount equal to at least 20 parts by weight based on 100 parts of the synthetic resin solids of the latex.

The quadricomponent interpolymer latices are interpolymers of (1) a monovinylidene aromatic compound, (2) a restricted class of alkyl esters of acrylic or methacrylic acid (sometimes hereinafter referred to as the unsaturated ester), (3) acrylic acid or monophenyl or monomethyl-substituted derivative thereof (sometimes hereinafter referred to as the unsaturated carboxylic acid), and (4) acrylonitrile or methacrylonitrile (sometimes hereinafter referred to as the unsaturated nitrile).

The unsaturated ester component of the interpolymer constitutes 35–60% and preferably 35–45% of the interpolymer; the unsaturated nitrile should comprise about 3–10% and preferably 4–8% of the interpolymer; the unsaturated monocarboxylic acid should comprise 2–5% of the interploymer with the balance of the interpolymer, i. e., 60–25% and preferably 60–40% of the interpolymer constituting monovinylidene hydrocarbon, all percentages being on a weight basis.

The monovinylidene aromatic hydrocarbon included in the interpolymer may be styrene, alpha-methylstyrene, p-chlorostyrene, 2,4-dichlorostyrene, 2,5-dichlorostyrene, p-methylstyrene, alpha-methyl-p-methylstyrene, m-ethylstyrene, p-isopropylstyrene, vinyl naphthalene, etc., or mixtures of two or more such vinylidene aromatic hydrocarbons.

The unsaturated esters included in the interpolymers are straight-chain or branched-chain aliphatic alcohol esters of acrylic or methacrylic acid. The alcohol radicals included in the esters should be saturated and should contain from 5–20 carbon atoms with the additional provision that the longest continuous chain in the alcohol radical should contain from 5–14 carbon atoms. Typical of the esters that may be employed are the acrylic and methacrylic acid esters of amyl alcohol, hexanol, 2-ethylhexanol, 2-methylpentanol, the oxo alcohol of an isobutylene dimer, heptyl, alcohol, 3-methylethyl alcohol, the oxo alcohol of an isobutylene trimer, the oxo alcohol of a propylene dimer, octyl alcohol, dodecyl alcohol, tridecyl alcohol, tetradecyl alcohol, etc.

Typical of the unsaturated carboxylic acids that may be included in the interpolymer are acrylic acid, methacrylic acid, cinnamic acid, atropic acid, crotonic acid, and mixtures of two or more of such unsaturated monocarboxylic acids.

The latices employed in the present invention are prepared by a special aqueous emulsion polymerization technique. In this procedure, all of the unsaturated nitrile monomer is admixed with from one-and-one-half to three times its weight of monovinylidene aromatic hydrocarbon, the mixture is added to water containing an emulsifying agent and polymerization initiator, and the mixture is then polymerized at from 30–150° C. with constant agitation to form a particulate copolymer dispersed in water. When the unsaturated nitrile and monovinylidene aromatic hydrocarbon have been substantially completely (i. e., 90–95% conversion) polymerized, the balance of the monomers is added and polymerization is continued under similar conditions until the reaction is complete.

The oil-modified alkyd resins of this invention are the so-called long oil alkyds derived from a polyhydric alcohol containing at least three hydroxyl groups, a polycarboxylic acid and a drying oil or drying oil fatty acid. The polycarboxylic acid should constitute from 5 to 25 weight percent of the resin and the oil acids should constitute 55–88 weight percent of the resin with the balance being polyhydric alcohol.

The polycarboxylic acid component of the resin is preferably phthalic acid. Other dicarboxylic or tricarboxylic acids such as sebacic, adipic, succinic, azelaic, tricarballylic, isophthalic, terephthalic, etc., acids may be used to replace the phthalic acid in whole or in part.

The oil component of the alkyd resin may be a drying or semi-drying oil or the oil acids derived therefrom. Among the oils and oil acids which are suitable are linseed, tung, oiticica, perilla, cashew nut shell, soybean, cottonseed, fish, etc., oils and oil acids. Since the oils are glycerides, the glycerol component thereof should be considered when calculating the total polyhydric alcohol content of the resin.

The long oil alkyd resins may be made by any of the conventional methods, one of which is illustrated in Example III. They are of relatively low molecular weight and are generally liquid or semi-solid materials. The liquid resins are preferred but the semi-solid resins can be used by dissolving them in limited quantities of aliphatic solvents. The amount of resin to be added to the quadricomponent interpolymer latex may range from 20–200 parts by weight per 100 parts of interpolymer.

The oil-modified alkyd resin can be readily emulsified in the synthetic resin latex through the use of conventional nonionic surfactants as the alkylaryl sulfonates, the alkyl sulfates, etc. In general, sufficient emulsifying agent will be included in the preparation of the quadricomponent interpolymer latex to emulsify up to 100 weight percent of oil-modified alkyd resin based on the quadricomponent interpolymer solids of the latex.

The pigments, driers, viscosity modifiers, etc., that are included in the pigmented protective coating compositions of this invention may be varied widely and are those conventionally employed in the art. The compositions of this invention are readily prepared by conventional techniques. Preferably, a latex base protective coating composition is prepared from the quadricomponent interpolymer latex by conventional techniques and the resin is then incorporated therein with gentle stirring. If desired, the resin can be omitted from the formulation and stirred into the latex base composition at the site at which the composition is to be employed.

The latices of this invention are adopted for application to porous surfaces to provide an undercoat which is unaffected by defects in the treated surface such as extreme weathering, excessive chalking, or lack of primer and which undercoat serves as an efficient and lasting anchor for top coats. The latices are particularly effective where the top or finish coat is to be an unmodified pigmented quadricomponent interpolymer. The nature of the surface which may be treated is immaterial as long as it is porous. Thus, the latices may be applied successfully to wood in the form of clapboards, shingles, and other shapes and designs, to asbestos-cement surfaces such as shingles, boards, etc., to masonry surfaces such as concrete, bricks, cinder blocks, stucco, field stone, etc., to cork insulation, etc.

The latices of this invention may be applied to the porous surfaces by conventional methods such as brushing, spraying, roll-coating, etc., to provide a continuous film having a thickness of from 0.5 to 5 mils. The films dry quickly to present a firm, chemically resistant coating which is substantially unaffected by water.

The above descriptions and examples are set forth by way of illustration only. Many other variations and modifications thereof will be obvious to those skilled in the art and can be made without departing from the spirit and scope of the invention herein described.

What is claimed is:

1. An aqueous latex paint suitable for application to untreated exterior surfaces as an undercoat comprising a pigmented aqueous latex containing 100 parts of a quadricomponent interpolymer and homogeneously admixed therewith from 20 to 200 parts of an oil-modified alkyd resin and mixtures thereof, said alkyd resin containing a drying catalyst, said quadricomponent interpolymer containing about (1) 35–60 parts of an unsaturated ester of the group consisting of straight-chain and branched-chain saturated aliphatic alcohol esters of acrylic and methacrylic acid containing a total of about 5–20 carbons in the alcohol radical of which about 5–14 carbon atoms comprise the longest continuous chain thereof, (2) 3–10 parts of an unsaturated nitrile of the group consisting of acrylonitrile and methacrylonitrile, (3) 2–5 parts of an unsaturated monocarboxylic acid of the group consisting of acrylic acid, methacrylic acid, cinnamic acid, atropic acid and crotonic acid, and (4) correspondingly, 60–25 parts by weight of a monovinylidene aromatic hydrocarbon, said quadricomponent interpolymer having been prepared by first partially polymerizing all of the nitrile component with from 1.5–3 times its weight of vinylidene aromatic hydrocarbon component, than adding the remaining components and finally completing the polymerization reaction, said oil-modified alkyd resin consisting of a polyhydric alcohol containing at least 3 hydroxyl groups, a polycarboxylic acid and a member of the group consisting of drying oils, semi-drying oils, drying oil acids, said resin containing from 5–25 weight percent of polycarboxylic acid, and from 55–88 weight percent of oil acids with the balance being polyhydric alcohol.

2. A paint as in claim 1 wherein the quadricomponent interpolymer consists of 40 parts of 2-ethylhexyl acrylate, 52 parts of styrene, 6 parts of acrylonitrile and 2 parts of methacrylic acid.

3. A paint as in claim 1 wherein the oil modified alkyd resin consists of the condensation product of about 16 weight percent pentaerythritol, about 16 weight percent of phthalic acid and about 68 weight percent soybean oil acids.

4. A paint as in claim 1 wherein the oil modified alkyd resin contains about 10 weight percent of phthalic acid, 76 weight percent of linseed oil acids and 14 weight percent of glycerol.

5. A porous surface carrying an undercoat of a quadricomponent interpolymer admixed with an oil modified alkyd resin and a top coat of a quadricomponent interpolymer, said quadricomponent interpolymer containing about (1) 35–60 parts of an unsaturated ester of the group consisting of straight-chain and branched-chain saturated aliphatic alcohol esters of acrylic and methacrylic acid containing a total of about 5–20 carbons in the alcohol radical of which about 5–14 carbon atoms comprise the longest continuous chain thereof, (2) 3–10 parts of an unsaturated nitrile of the group consisting of acrylonitrile and methacrylonitrile, (3) 2–5 parts of an unsaturated monocarboxylic acid of the group consisting of acrylic acid, methacrylic acid, cinnamic acid, atropic acid and crotonic acid, and (4) correspondingly, 60–25 parts by weight of a monovinylidene aromatic hydrocarbon, said quadricomponent interpolymer having been prepared by first partially polymerizing all of the nitrile component with from 1.5–3 times its weight of vinylidene aromatic hydrocarbon component, then adding the remaining components and finally completing the polymerization reaction, said oil-modified alkyd resin consisting of a polyhydric alcohol containing at least 3 hydroxyl groups, a polycarboxylic acid and a member of the group consisting of drying oils, semi-drying oils, drying oil acids, semi-drying oil acids and mixtures thereof, said resin containing from 5–25 weight percent of polycarboxylic acid, and from 55–88 weight percent of oil acids with the balance being polyhydric alcohol.

References Cited in the file of this patent
UNITED STATES PATENTS 2,767,153     Sutton _____ Oct. 16, 1956

OTHER REFERENCES

Payne, Organic Coating Technology, vol. 1, published by John Wiley and Sons, Inc., New York (pages 290 to 295 and 372 to 377 relied upon).